US010451873B2

United States Patent
Park et al.

(10) Patent No.: US 10,451,873 B2
(45) Date of Patent: Oct. 22, 2019

(54) COMBINER-POSITIONING APPARATUS FOR VEHICULAR HEAD-UP DISPLAY AND VEHICLE INCLUDING THE SAME

(71) Applicant: LG Electronics Inc., Seoul (KR)

(72) Inventors: Hongsoo Park, Seoul (KR); Jaeseung Lee, Seoul (KR); Yongsang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 17 days.

(21) Appl. No.: 15/498,154

(22) Filed: Apr. 26, 2017

(65) Prior Publication Data

US 2017/0315354 A1 Nov. 2, 2017

(30) Foreign Application Priority Data

Apr. 27, 2016 (KR) .................. 10-2016-0051592

(51) Int. Cl.
| | | |
|---|---|---|
| *G02B 27/14* | (2006.01) | |
| *G02B 27/01* | (2006.01) | |
| *B60K 35/00* | (2006.01) | |
| *B60K 37/04* | (2006.01) | |

(52) U.S. Cl.
CPC .......... *G02B 27/0149* (2013.01); *B60K 35/00* (2013.01); *B60K 37/04* (2013.01); *B60K 2370/1529* (2019.05); *B60K 2370/66* (2019.05); *B60K 2370/67* (2019.05); *G02B 2027/0156* (2013.01); *G02B 2027/0163* (2013.01)

(58) Field of Classification Search
CPC ........ G02B 27/0149; G02B 2027/0178; G02B 2027/0163; G02B 2027/0156; G02B 27/0101; G02B 27/01; B60K 35/00; B60K 2350/106; B60K 2350/2052; B60K 2350/921; B60K 2350/2095
See application file for complete search history.

(56) References Cited

U.S. PATENT DOCUMENTS

| | | | |
|---|---|---|---|
| 2012/0176683 A1 | 7/2012 | Rumpf et al. | |
| 2012/0188650 A1 | 7/2012 | Rumpf et al. | |
| 2014/0340851 A1* | 11/2014 | Yomogita ............ | H05K 5/0017 361/725 |

FOREIGN PATENT DOCUMENTS

| | | |
|---|---|---|
| JP | 2012-150420 A | 8/2012 |
| JP | 2015-121632 A | 7/2015 |
| JP | 2016-99461 A | 5/2016 |
| KR | 10-2013-0073966 A | 7/2013 |
| KR | 10-2015-0028561 A | 3/2015 |
| KR | 10-2015-0117117 A | 10/2015 |
| KR | 10-1640579 B1 | 7/2016 |
| KR | 10-2016-0141009 A | 12/2016 |
| KR | 10-1781190 B1 | 9/2017 |

* cited by examiner

*Primary Examiner* — Alicia M Harrington
(74) *Attorney, Agent, or Firm* — Birch, Stewart, Kolasch & Birch, LLP

(57) ABSTRACT

A combiner-positioning apparatus for a vehicular head-up display is provided. The combiner-positioning apparatus includes a drive unit for supplying a driving force, a combiner assembly including a combiner, the combiner being projected and exposed to an outside or retracted or hidden into a slot formed in a dashboard by the driving force, a guide unit for guiding sliding movement of the combiner assembly in a vertical direction, and a power transmitter for transmitting the driving force to the combiner assembly.

17 Claims, 23 Drawing Sheets

COMBINER-POSITIONING APPARATUS FOR VEHICULAR HEAD-UP DISPLAY AND VEHICLE INCLUDING THE SAME

CROSS-REFERENCE TO RELATED APPLICATION

This application claims the priority benefit of Korean Patent Application No. 10-2016-0051592, filed on Apr. 27, 2016 in the Korean Intellectual Property Office, the disclosure of which is incorporated herein by reference.

BACKGROUND OF THE INVENTION

1. Field of the Invention

The present invention relates to a combiner-positioning apparatus for a vehicular head-up display and a vehicle including the same.

2. Description of the Related Art

A vehicle is an apparatus capable of travelling in a direction desired by a driver. A representative example of a vehicle may be an automobile.

For the convenience of vehicle users, the recent trend is for vehicles to be provided with various sensors and electronic devices. In particular, for the convenience of user's driving, research into an advanced driver assistance system (ADAS) has been actively conducted. Among them, research into autonomous vehicles has been actively conducted.

Recent vehicles are provided with various display devices. One of them is a head-up display (HUD). In order to reduce the problem whereby the content displayed on the display is not familiarly felt by a user during the operation of an image projection-type HUD, a combiner may be utilized.

However, in the case in which the combiner is fixedly mounted on a dashboard without using a HUD, the combiner interferes with the driver's field of view. Furthermore, there is another problem whereby the combiner occupies a certain space in the vehicle.

For this reason, apparatuses, which are constructed such that a combiner is retracted and hidden inside a dashboard while a HUD is not used and is projected and exposed to the outside while the HUD is used, have been developed.

However, there is a problem in that conventional combiner-positioning apparatuses occupy a large volume in a cockpit module of a vehicle. There is a need to minimize the volume of a combiner-positioning apparatus because a cockpit module of a vehicle must be provided therein with various apparatuses.

SUMMARY OF THE INVENTION

Therefore, the present invention has been made in view of the above problems, and it is an object of embodiments of the present invention to provide a combiner-positioning apparatus for a vehicular head-up display, which is constructed so as to slidably move a combiner assembly vertically.

Another object of the embodiments of the present invention is to provide a vehicle including the combiner-positioning apparatus for a vehicular head-up display.

The objects of the present inventions are not limited to the above-mentioned objects, and other objects of the present invention will be clearly understood by those skilled in the art from the following disclosure.

In accordance with an aspect of the present invention, the above and other objects can be accomplished by the provision of a combiner-positioning apparatus for a vehicular head-up display, including a drive unit for supplying a driving force, a combiner assembly including a combiner, the combiner being projected and exposed to an outside or retracted or hidden into a slot formed in a dashboard by the driving force, a guide unit for guiding sliding movement of the combiner assembly in a vertical direction, and a power transmission unit for transmitting the driving force to the combiner assembly.

Specific details of other embodiments will be disclosed in the following detailed description and the accompanying drawings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
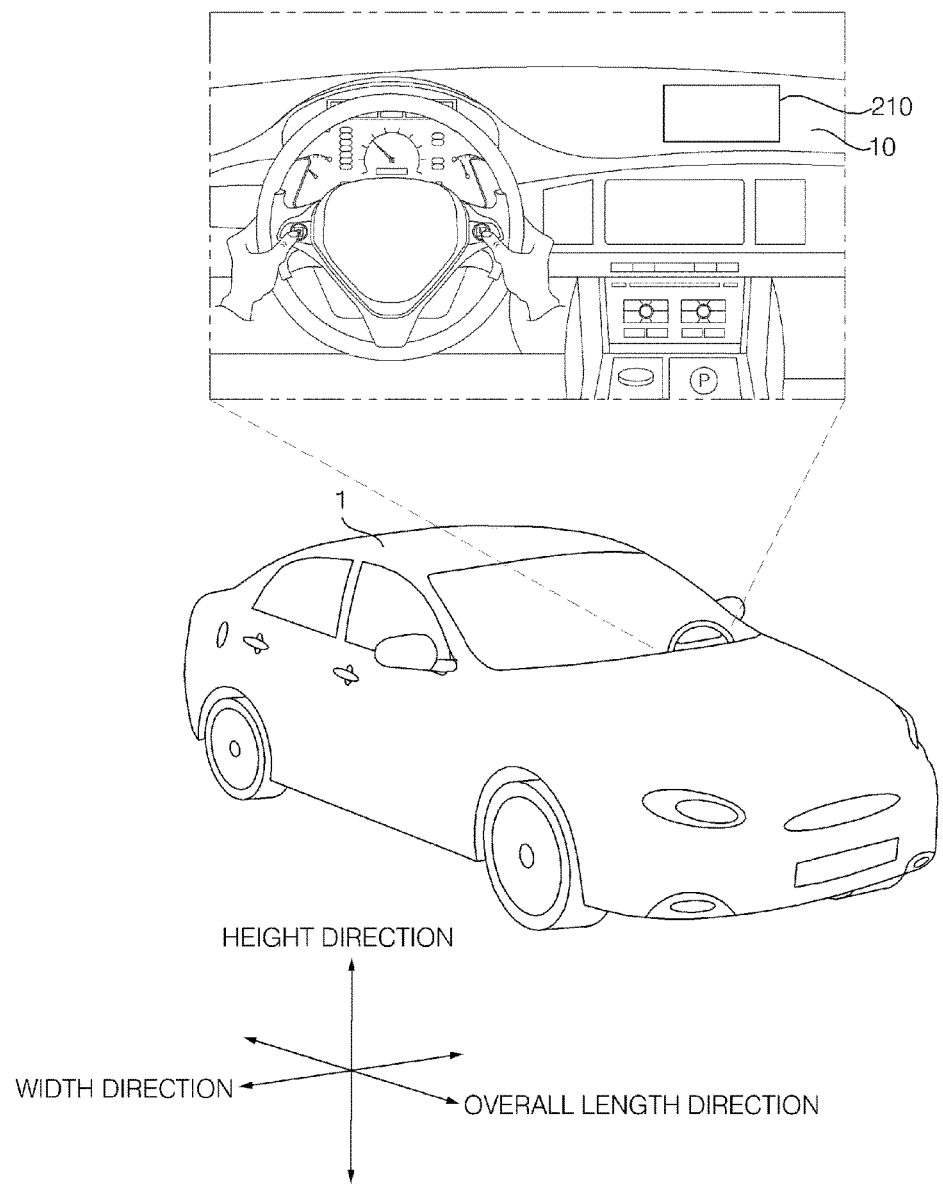
FIG. 1 is a view illustrating the appearance of a vehicle according to an embodiment of the present invention.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit", which are used in the following description, may be used to refer to elements or components for easy preparation of the specification. Use of such suffixes herein is merely intended to facilitate description of the specification, and the suffixes do not have any special meaning or function. Furthermore, in the following description of embodiments disclosed herein, if it is decided that the detailed description of known function or configuration related to the invention makes the subject matter of the invention unclear, the detailed description is omitted. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms "first", "second", etc. may be used herein to describe various elements, these elements should not be limited by these terms. These terms are only used to distinguish one element from another.

It should be understood that, when an element is referred to as being "connected with" another element, there may be intervening elements present, or the element may be directly connected with the other element. In contrast, it should be understood that, when an element is referred to as being "directly connected with" another element, there are no intervening elements present.

A singular representation may include a plural representation unless context clearly indicates otherwise.

Terms such as "includes" or "has" used herein should be considered as indicating the presence of several features, numbers, steps, operations, elements, components or combinations thereof disclosed in the specification, and it should be understood that the presence or addition of one or more other features, numbers, steps, operations, elements, components or combinations thereof may likewise be utilized.

The term "vehicle" disclosed herein may be used to indicate a concept including automobiles and motorcycles. In the following description, a vehicle will be described based on an automobile.

A vehicle disclosed herein may be used to indicate a concept including all of an internal combustion vehicle having an engine serving as a power source, a hybrid vehicle having an engine and an electric motor, serving as a power source, and an electric vehicle having an electric motor serving as a power source.

In the following description, the term "left" indicates the left side of a vehicle when viewed in a forward travelling direction, and the term "right" indicates the right side of a vehicle when viewed in a forward travelling direction.

In the following description, the term "forward" may indicate the forward travelling direction of a vehicle 1, and the term "backward" may indicate the backward travelling direction of the vehicle 1.

FIG. 1 is a view illustrating the appearance and a cockpit module of a vehicle according to an embodiment of the present invention.

Referring to FIG. 1, the vehicle 1 may include wheels, which are rotated by a power source, and a steering input apparatus for controlling the travelling direction of the vehicle 1.

In some embodiments, the vehicle 1 may be an autonomous vehicle. In the case of such an autonomous vehicle, conversion between an autonomous mode and a manual mode can be implemented in accordance with user input. When the operational mode is switched to the manual mode, the autonomous vehicle 1 may receive steering input through the steering input apparatus.

The vehicle 1 may include an engine for supplying power using fossil fuel, or an electric motor for supplying power from a DC power source such as a solar cell, a battery etc., or the like. Furthermore, the vehicle 1 may include a transmission for converting power from an engine into rotational force, a braking device for stopping the movement of the vehicle 1 and so forth.

The vehicle 1 may include a vehicle driver assistance apparatus. The vehicle driver assistance apparatus is an apparatus for assisting a driver based on information obtained by various sensors. Such a vehicle driver assistance apparatus may be referred to as an advanced drive assistance system (ADAS).

The vehicle 1 may include a vehicular display device, which is provided in the vehicle interior so as to serve as output and input devices. For example, the vehicle 1 may include a head-up display device as the vehicular display device.

The head-up display device may project an image on a front windshield or a combiner 210. The head-up display device may include an image output unit, which creates an image and projects the image on the front windshield or combiner 210.

The vehicle 1 may include a combiner-positioning apparatus 100 for the head-up display. The combiner-positioning apparatus 100 for the head-up display is able to expose or hide the combiner depending on the use of the head-up display.

To this end, a dashboard 10 may be provided with a slot. The combiner 210 may be retracted into the slot or may be projected so as to be exposed to the outside. Here, the outside means the interior of the vehicle 1.

The combiner-positioning apparatus 100 for the head-up display may be simply referred to as a combiner-positioning apparatus.

Here, "overall length" means the length from the front end to the rear end of the vehicle 1, "width" means the width of the vehicle 1, and a "height" means the distance from the lower end of a wheel to the top of the roof of the vehicle 1. In the following description, the overall length direction L may be the direction based on which the overall length of the vehicle 1 is measured, the width direction W may be the direction based on which the width is measured, and the height direction H may be the direction based on which the height is measured.

In the following description, "lateral direction" may be the width direction. "Vertical direction" may be the height direction. "Longitudinal direction" may be the overall length direction.

Figure 2A:
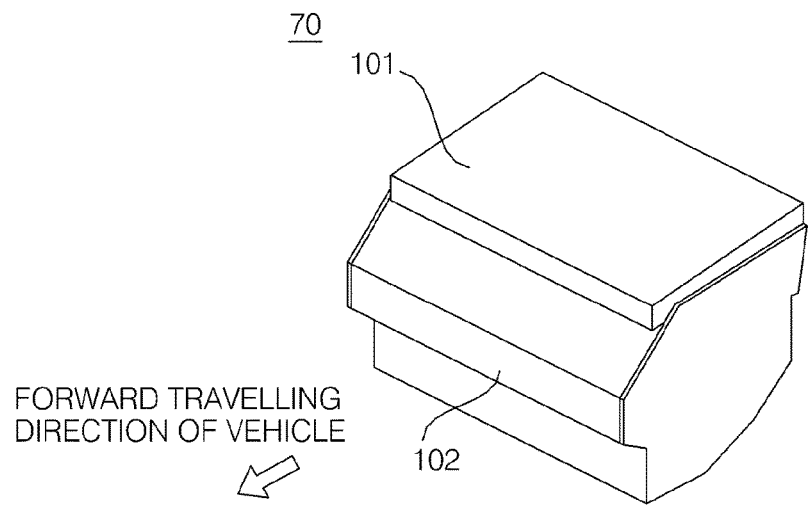
FIGS. 2A and 2B illustrate the appearance of a head-up display apparatus including the combiner-positioning apparatus according to the embodiment of the present invention.
Figure 2B:
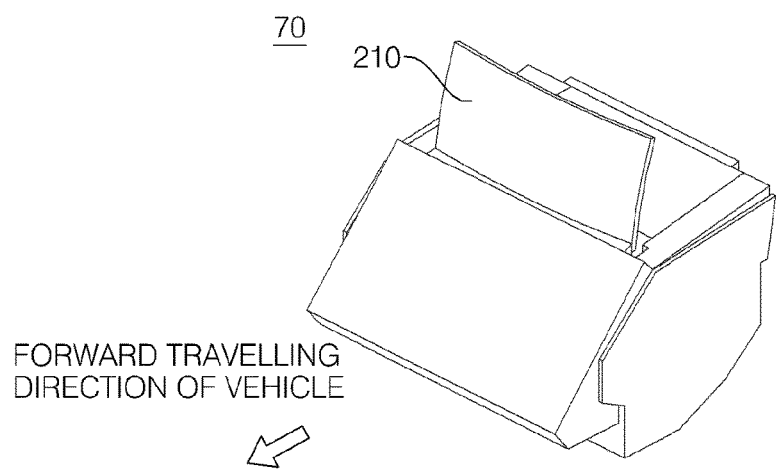

FIGS. 2A and 2B illustrate the appearance of the head-up display apparatus including the combiner-positioning apparatus according to the embodiment of the present invention.

FIG. 2A illustrates the head-up display apparatus 70 including the combiner-positioning apparatus 100, in which a main cover 101 is closed. FIG. 2B illustrates the head-up display apparatus 70 including the combiner-positioning apparatus 100, in which a main cover 101 is opened.

The head-up display apparatus 70 may include the image output unit and the combiner-positioning apparatus 100.

The image output unit may create an image and may project the image on the combiner 210. The head-up display apparatus 70 may further include an image transmission unit for transmitting the image, created in the image output unit, to the combiner 210.

Referring to the drawings, the head-up display apparatus 70 may include a housing 102 and a main cover 101.

The housing 102 may define the appearance of the head-up display apparatus 70. The housing 102 may accommodate various components, which are included in the image output unit and the combiner-positioning apparatus 100.

The main cover 101 may be movably coupled to the housing 102. The main cover 101 may be manually or automatically moved in the forward direction of the vehicle 1. In the case in which the main cover 101 is automatically opened and closed, the head-up display apparatus 70 may include a motor for opening and closing the main cover 101.

As illustrated in FIG. 2B, when the combiner 210 is exposed to the outside, the main cover 101 is opened. Here, "outside" means the interior of the vehicle 1.

Figure 3A:
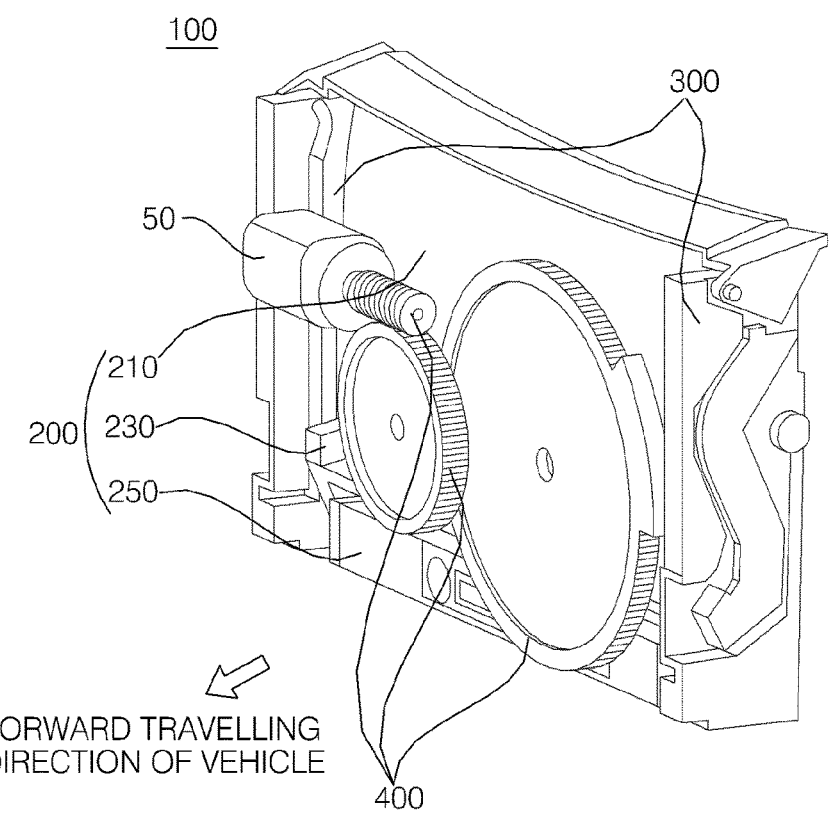
FIGS. 3A and 3B illustrate the internal construction of the combiner-positioning apparatus according to the embodiment of the present invention.
Figure 3B:
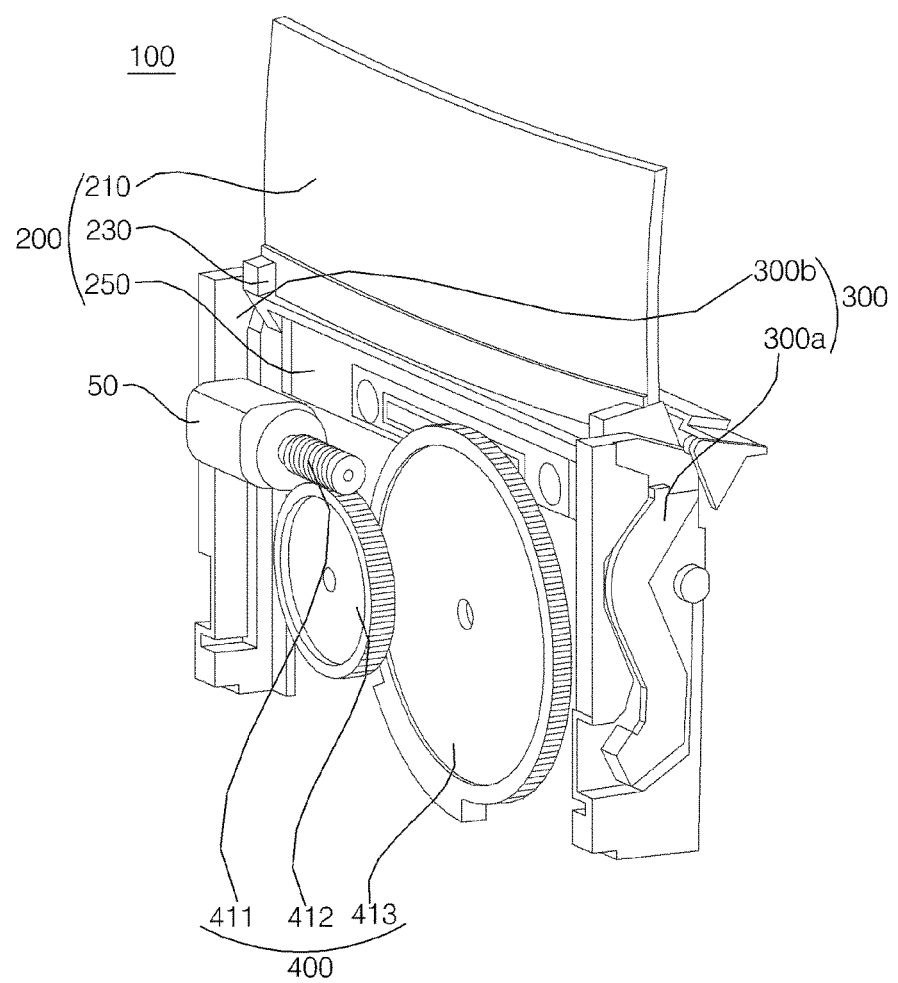

FIGS. 3A and 3B illustrate the internal construction of the combiner-positioning apparatus according to the embodiment of the present invention.

FIG. 3A illustrates the internal construction of the combiner-positioning apparatus 100, in which the combiner 210 is retracted and thus hidden. FIG. 3B illustrates the internal construction of the combiner-positioning apparatus 100, in which the combiner 210 is projected and thus exposed.

Referring to the drawings, the combiner-positioning apparatus 100 may include a drive unit 50, a combiner assembly 200, a guide unit 300 and a power transmission unit 400. The drive unit 50 may be named a driver. The guide unit 300 may be named a guide mechanism. The power transmission unit 400 may be named a power transmitter.

The drive unit 50 may create a driving force. The drive unit 50 may include a motor. The drive unit 50 may supply the driving force created by the motor.

The driving force, which is created in the drive unit 50, may be supplied to the combiner assembly 200 via the power transmission unit 400. For example, the drive unit 50 may supply the driving force required for movement of the combiner assembly 200 in the vertical direction. For example, the drive unit 50 may supply the driving force required to tilt the combiner 210. in another example, the drive unit 50 may supply the driving force required to open and close a slot cover 600.

By the driving force supplied from the single drive unit 50, the combiner 210 may be hidden and exposed, the combiner 210 may be tilted, and the slot cover 600 may be opened and closed. Consequently, since a plurality of operations can be implemented suing a single drive unit 50, there is an effect of reducing the number of components and thus the entire volume of the combiner-positioning apparatus.

The combiner assembly 200 may include the combiner 210, a holder 230 and a lifting module 250.

The combiner 210 may be projected and exposed to the outside or may be retracted and hidden into the slot formed in the dashboard by the driving force supplied from the drive unit 50.

The holder 230 may hold the combiner 210.

The lifting module 250 may be moved vertically by the driving force transmitted via a cam wheel 413 of the power transmission unit 400.

The combiner assembly 200 is described in detail with reference to FIG. 4.

The guide unit 300 may guide the siding movement of the combiner assembly 200 in the vertical direction.

The guide unit 300 may include a first guide part 300a and a second guide part 300b. The first guide part 300a may be disposed to the left of the combiner assembly 200. The second guide part 300b may be disposed to the right of the combiner assembly 200.

The guide unit 300 will be described in detail with reference to FIG. 11.

The power transmission unit 400 may transmit driving force, created in the drive unit 50, to the combiner assembly 200.

The power transmission unit 400 may include a plurality of gears. The power transmission unit 400 may be appropriately disposed so as to enable the combiner-positioning apparatus 100 to be miniaturized and thinned.

The power transmission unit will be described in detain with reference to FIGS. 5 and 6.

Figure 4:
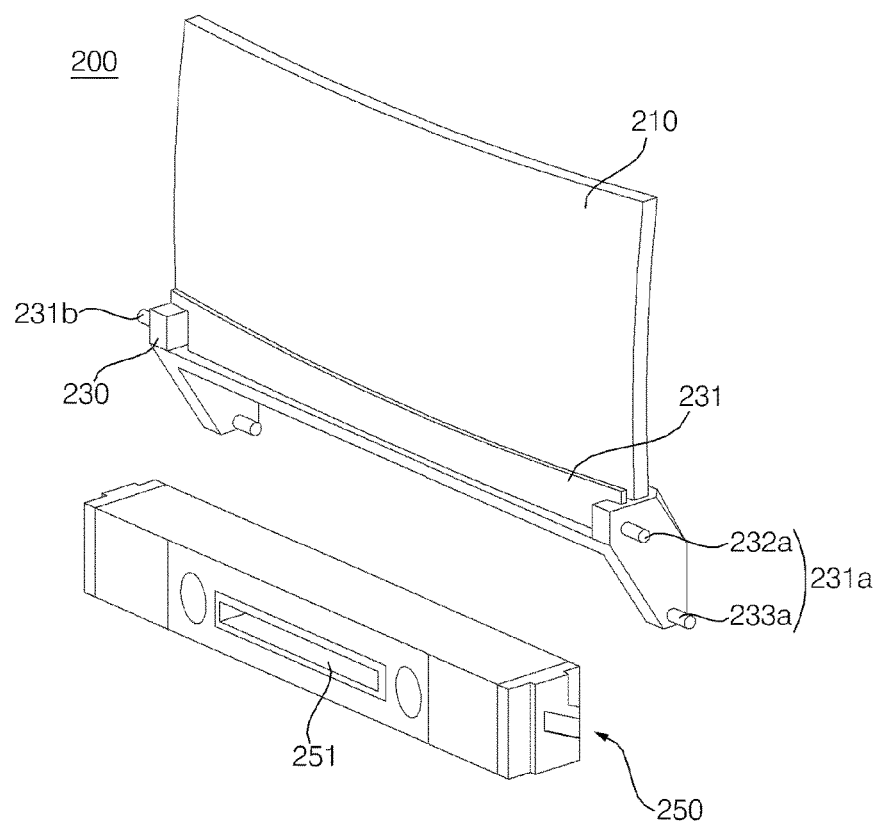
FIG. 4 is a view illustrating the combiner assembly according to the embodiment of the present invention.

FIG. 4 is a view illustrating the combiner assembly 200 according to the embodiment of the present invention.

Referring to the drawing, the combiner assembly 200 may include the combiner 210, the holder 230 and the lifting module 250.

The combiner 210 may be exposed to the outside by the driving force supplied from the drive unit 50. The combiner 210 may be retracted and hidden into the slot formed in the dashboard 10 by the driving force supplied from the drive unit 50.

The combiner 210 may be made of a transparent material. For example, the combiner 210 may be made of glass or a transparent synthetic resin.

The combiner 210 serves as a screen for displaying the image projected from the image output unit.

The holder 230 may hold the combiner 210, and may be provided with combiner-moving bosses 231a and 231b, which are slidably moved along movement guide rails 310a, 310b, 320a and 320b (see FIGS. 11A and 11B), which are included in the guide unit 300.

The holder 230 may support the combiner 210. The holder 230 may include a support 231 for securely supporting the combiner 210 in the vertical direction.

The support 231 may support the combiner 210 while being in contact with one side of the combiner 210. The support 231 and the combiner 210 may be coupled to each other by means of a predetermined fastening element. After the combiner 210 is mounted on the holder 230, the support 231 is coupled to the holder 230 and the combiner 210, thereby firmly supporting the combiner 210.

The holder 230 may include the combiner-moving bosses 231a and 231b.

The combiner-moving bosses 231a and 231b may include a pair of combiner-moving bosses, which are respectively disposed to the right and the left. The combiner-moving bosses 231a and 231b may be symmetrically disposed at opposite ends of the holder 230. The combiner-moving bosses may include a first combiner-moving boss 231a and a second combiner-moving boss 231b.

The first combiner-moving boss 231a may include a first pin 232a and a second pin 233a.

The first pin 232a may project from the holder 230 toward a first guide part 300a. For example, the first pin 232a may project from the holder 230 toward the inside of the first guide part 300a. For example, the first pin 232a may project toward a first guide rail 310a (see FIG. 11A).

The first pin 232a may be moved along the first guide rail 310a, among the movement guide rails formed in the first guide part 300a.

The second pin 233a may project from the holder 230 toward the first guide part 300a. For example, the second pin 233a may project from the holder 230 toward the inside of the first guide part 300a. For example, the second pin 233a may project toward the second guide rail 320a (see FIG. 11A).

The second pin 233a may be spaced apart from the first pin 232a. For example, the second pin 233a may be disposed below the first pin 232a. In another example, the second pin 233a may be disposed behind the first pin 232a.

The second pin 233a may be moved along the second guide rail 320a among the movement guide rails formed in the first guide part 300a.

The first pin 232a and the second pin 233a are respectively moved along the first guide rail 310a and the second guide rail 320a, whereby the combiner assembly 200 may be slidably moved along a predetermined path in the vertical direction.

The second combiner-moving boss 231b may be symmetrically configured with respect to the first combiner-moving boss 231a.

In other words, the second combiner-moving boss 231b may include a first pin and a second pin. The first pin and the second pin, which are included in the second combiner-moving boss 231b, may be symmetrically configured with respect to the first pin 232a and the second pin 233a, which are included in the first combiner-moving boss 231a.

The description of the first combiner-moving boss 231a may also be applied to the second combiner-moving boss 231b.

The lifting module 250 may include a lifting rail 251. The lifting rail 251 formed in the lifting module 250 may be formed so as to face the power transmission unit 400. For example, the lifting rail 251 may be formed so as to face a cam wheel 413 included in the power transmission unit 400.

The lifting rail 251 may guide the movement of a combiner-driving boss 414 provided at the cam wheel 413.

The cam wheel 413 is rotated while the combiner-driving boss 414 is disposed in the lifting rail 251, whereby the lifting module 250 can be moved vertically. As the lifting module 250 is moved, the holder 230 and the combiner 210, which are connected to the lifting module 250, can also be moved vertically. Consequently, the combiner 210 may be projected and exposed to the outside, or may be retracted and hidden into the slot formed in the dashboard.

Figure 5:
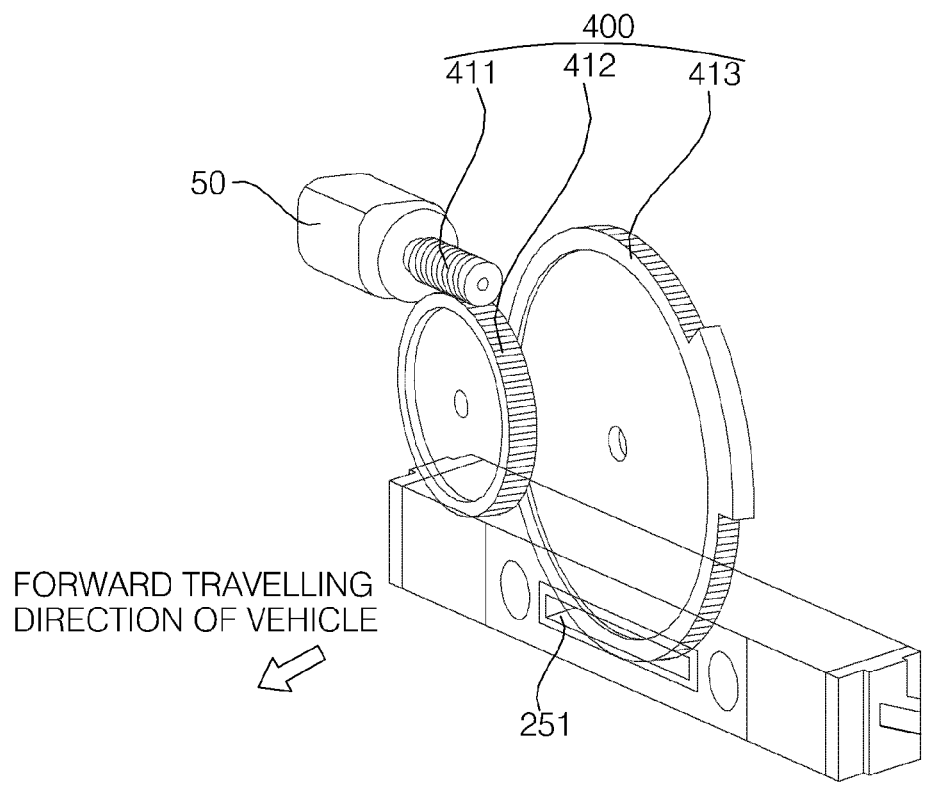
FIGS. 5 and 6 are views illustrating the power transmission unit according to the embodiment of the present invention.
Figure 6:
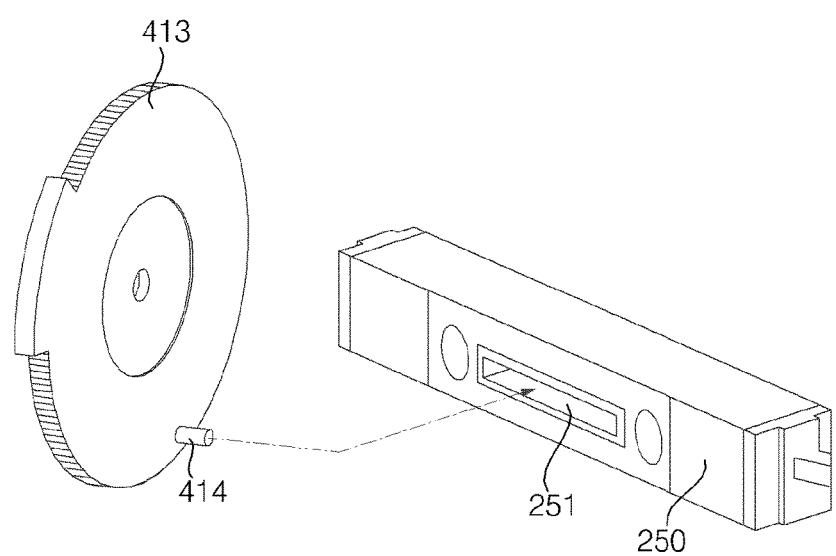

FIGS. 5 and 6 are views illustrating the power transmission unit according to the embodiment of the present invention.

The power transmission unit 400 may include a plurality of gears 411, 412 and 413. For example, the power transmission unit 400 may include a worm 411, a multi-stage gear 412 and the cam wheel 413.

The worm 411 may be connected to the drive unit 50. For example, the worm 411 may be connected to a shaft of a motor included in the drive unit 50.

The multi-stage gear 412 may be a dual-stage gear. The teeth formed on the first stage of the multi-stage gear may be engaged with the worm 411. The teeth formed on the second stage of the multi-stage gear 412 may be engaged with the cam wheel 413.

The teeth of the cam wheel 413 may be engaged with the teeth formed on the second stage of the multi-stage gear 412.

The rotational driving force from the motor included in the drive unit 50 may be transmitted to the cam wheel 413 via the worm 411 and the multi-stage gear 412. The cam wheel 413 may be rotated by the rotational driving force transmitted thereto.

The cam wheel 413 may include the combiner-driving boss 414. The combiner-driving boss 414 may project from one side of the cam wheel 413 toward the combiner assembly 200. For example, the combiner-driving boss 414 may project toward the lifting rail 251.

As illustrated in FIG. 6, the combiner-driving boss 414 may be inserted into the lifting rail 251. The combiner-driving boss 414 may be linearly moved along the lifting rail 251 in the lateral direction.

As the combiner-driving boss 414 is linearly moved along the lifting rail 251 while being disposed in the lifting rail 251, the lifting module 250 may be moved vertically. By the movement of the lifting module 250, the holder 230 and the combiner 210, which are connected to the lifting module 250, may also be moved vertically. Consequently, the combiner 210 may be projected and exposed to the outside, or may be retracted and hidden into the slot formed in the dashboard.

The cam wheel 413 serves to convert rotational movement into linear movement.

The cam wheel 413 may be disposed so as to face the combiner assembly 200. For example, a major surface of the cam wheel is disposed so as to face the combiner. For example, the cam wheel 413 may be disposed so as to face the combiner 210. Alternatively, the cam wheel 413 may be disposed parallel to the combiner 210. Since the cam wheel 413 is disposed so as to face the combiner 210 in this manner, the volume that is occupied by the power transmission unit 400 is minimized, thereby advantageously miniaturizing and thinning the vehicular head-up display apparatus 70.

Figure 7:
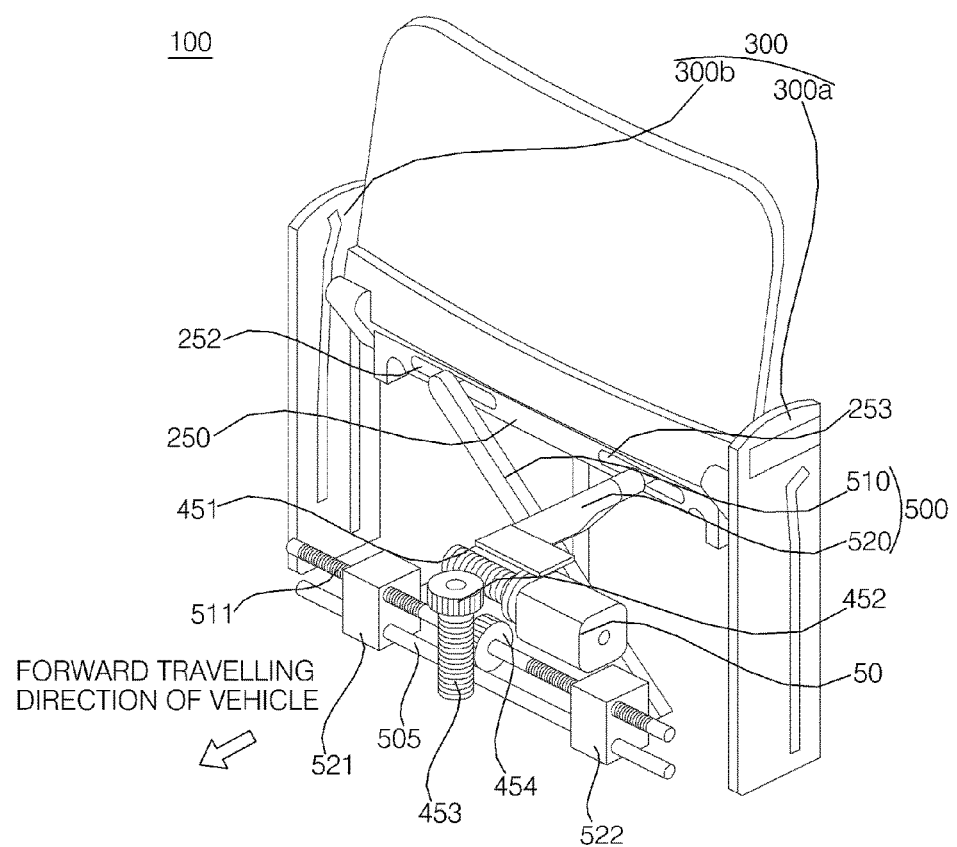
FIG. 7 is a view illustrating a mechanism for vertically moving the combiner using a cross bar link, according to an embodiment of the present invention.

FIG. 7 is a view illustrating a mechanism for vertically moving the combiner using a cross bar link, according to an embodiment of the present invention.

Referring to the drawing, the combiner-positioning apparatus 100 may include the drive unit 50, the combiner assembly 200, the guide unit 300, the power transmission unit 400, a crossbar link 500, a first slider 521 and a second slider 522.

Unless otherwise specified, the description, which is made with reference to FIGS. 2 to 6, may also be applied to the drive unit 50, the combiner assembly 200, the guide unit 300 and the power transmission unit 400 of this embodiment.

The crossbar link 500 may include a first crossbar 510 and a second crossbar 520. The first crossbar 510 and the second crossbar 520 may be disposed so as to intersect each other at the axis of intersection.

The crossbar link 500 may include a first pin and a second pin.

The first pin may be formed at the upper end of the first crossbar 510. The first pin may be formed so as to project from the first crossbar 510 toward a first lift rail 252.

The second pin may be formed at the upper end of the second crossbar 520. The second pin may be formed so as to project from the second crossbar 520 toward a second lift rail 253.

The first and second pins may be formed to be symmetrical to each other in the lateral direction.

The combiner assembly 200 may include a lifting module 250. The lifting module 250 may be provided with a first lifting rail 252 and a second lifting rail 253. The first lifting rail 252 and the second lifting rail 253 may be formed to be symmetrical to each other in the lateral direction.

The first pin provided at the crossbar link 500 may be inserted into the first lifting rail 252. The first pin may be linearly moved in the lateral direction along the first lifting rail 252 while being disposed in the first lifting rail 252.

The second pin provided at the crossbar link 500 may be inserted into the second lifting rail 253. The second pin may be linearly moved along the second lifting rail 253 in the lateral direction while being disposed in the second lifting rail 253.

The first and second pins provided at the crossbar link 500 may be linearly moved along the first and second lifting rails 252 and 253 in the lateral direction while being disposed in the first and second lifting rails 252 and 253. The first and second pins provided at the crossbar link 500 may be moved in a symmetrical fashion in the lateral direction.

The power transmission unit 400 may include a first worm 451, a first worm gear 452, a second worm 453, a second worm gear 454 and a bidirectional lead screw 511.

The first worm 451, the first worm gear 452, the second worm 453 and the second worm gear 454 may be collectively referred to as a worm gear module. The worm gear module may transmit driving force, created in the drive unit 50, to the bidirectional lead screw 511.

The first worm 451 may be connected to a shaft of a motor included in the drive unit 50.

The first worm gear 452 may be engaged with the first worm 451.

The second worm 453 may be connected to the first worm gear 452. For example, the first worm gear 452 and the second worm 453 may be integrally formed with each other.

The second worm gear 454 may be engaged with the second worm 453.

The second worm gear 454 may be connected to the bidirectional lead screw 511. For example, the shaft of the bidirectional lead screw 511 and the second worm gear 454 may be integrally formed with each other.

The opposite ends of the bidirectional lead screw 511 may be respectively connected to a first slider 521 and a second slider 522. The first slider 521 and the second slider 522 may be threadedly connected to the bidirectional lead screw 511.

The motor included in the drive unit 50 may supply a rotational driving force. By the rotational driving force, the first worm 451 may be rotated. As the first worm 451 is rotated, the first worm gear 452, connected to the first worm 451, may be rotated. As the first worm gear 452 is rotated, the second worm 453, which is integrally formed with the first worm gear 452, may be rotated. As the second worm 453 is rotated, the second worm gear 454, connected to the second worm gear 452, may be rotated. As the second worm gear 454 is rotated, the bidirectional lead screw 511, which is integrally formed with the second worm gear 454, may be rotated. As the bidirectional lead screw 511 is rotated, the first slider 521 and the second slider 522 may be moved in the lateral direction.

The first slider 521 and the second slider 522 may be moved close to each other when the motor rotates in a first direction. The first slider 521 and the second slider 522 may be moved away from each other when the motor rotates in a second direction.

The first slider 521 and the second slider 522 may be connected to a support shaft 505. For example, the first slider 521 and the second slider 522 may be provided with respective holes. The support shaft 505 may extend through the holes, which are respectively formed in the first slider 521 and the second slider 522.

The first slider 521 and the second slider 522 may be connected to the crossbar link 500. For example, the first slider 521 may be connected to the lower end of the second crossbar 520, and the second slider 522 may be connected to the lower end of the first crossbar 510.

As the first slider 521 and the second slider 522 are moved laterally, the first crossbar 510 and the second crossbar 520, which are included in the crossbar link 500, may be rotated crosswise about the axis of intersection.

As the first and second slider 521 and 522 of the crossbar link 500 are rotated crosswise, the first pin, disposed in the first lift rail 252, may be moved laterally along the first lift rail 252, and the second pin, disposed in the second lift rail 252, may be moved laterally along the second lift rail 252.

As the first pin and the second pin are moved, the lifting module 250 may be moved vertically. As the lifting module 250 is moved, the holder 230 and the combiner 210, which are connected to the lifting module 250, may also be moved vertically. Consequently, the combiner 210 may be projected and exposed to the outside, or may be retracted and hidden into the slot formed in the dashboard.

Figure 8:
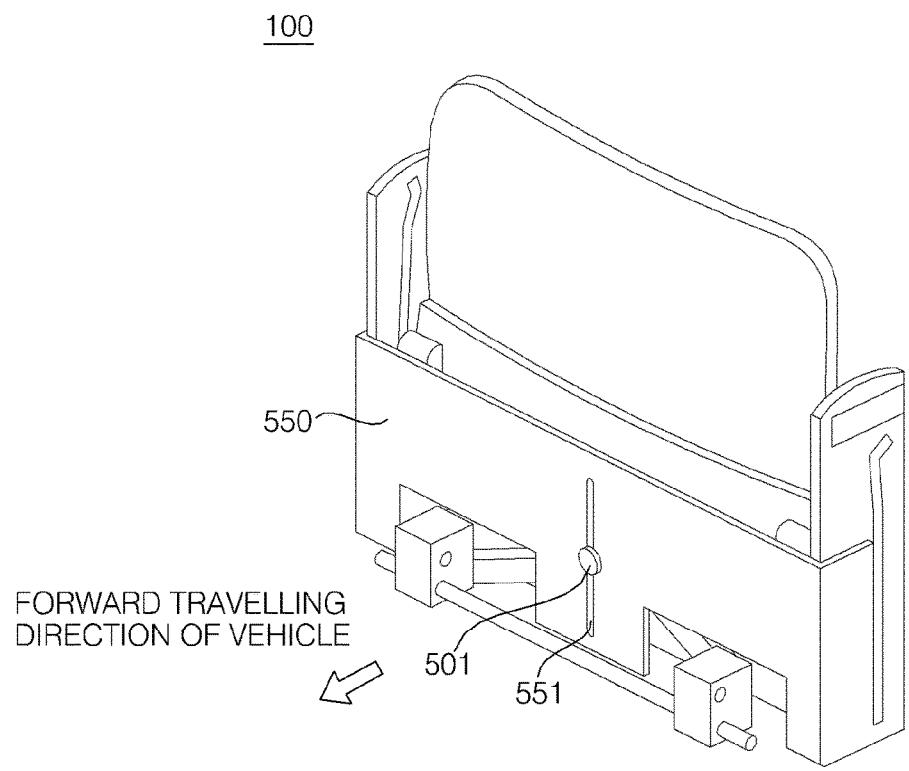
FIG. 8 is a view illustrating a bracket according to the embodiment of the present invention.

FIG. 8 is a view illustrating a bracket according to this embodiment of the present invention.

Referring to the drawing, the combiner-positioning apparatus 100 may further include the bracket 550. The bracket 550 may cover the drive unit 50, the combiner assembly 200 and the power transmission unit 400.

The bracket 550 may include a guide slit 551 vertically formed therethrough.

A guide pin 501, which extends from the axis of intersection of the crossbar link 500, may extend through the guide slit 551.

As the crossbar link 500 is moved, the guide pin 501 may be moved vertically while being disposed in the guide slit 551.

Since the guide pin 501 is moved along the guide slit 551, it is possible to prevent deviation of the crossbar link 500 from its own path due to the repeated movement and to improve durability.

Figure 9:
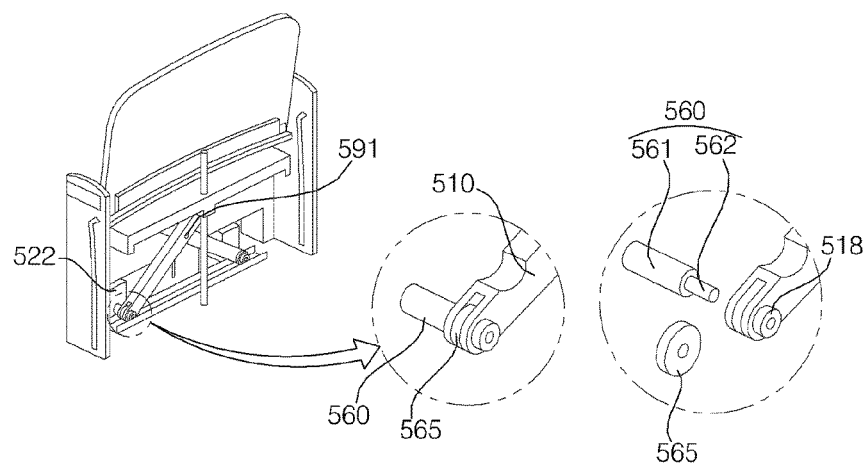
FIG. 9 is a view illustrating the connection between a crossbar link and first and second sliders, according to the embodiment of the present invention.

FIG. 9 is a view illustrating the connection between the crossbar link and the first and second sliders, according to this embodiment of the present invention.

Referring to the drawing, the first slider 521 and the second slider 252 may be connected to the crossbar link 500.

The second slider 522 may be connected to the lower end of the first crossbar 510.

The second slider 522 may include a projection 560, which projects toward the first crossbar 510.

The projection 560 may include a cylindrical body 561 and a cylindrical coupling portion 562 formed on the end of the body 561 in a stepwise fashion. The diameter of the coupling portion 562 is smaller than the diameter of the body 561. The coupling portion 562 and the body 561 may be formed concentrically. The coupling portion 562 and the body 561 may be integrally formed with each other.

The first crossbar 510 may be provided in the lower end thereof with a hole 518. The coupling portion 562 of the second slider 522 may be inserted into the hole 518 formed in the lower end of the first crossbar 510.

When the coupling portion 562 is inserted into the hole 518 in the first crossbar 510, a roller 565 may be disposed in the lower end of the first crossbar 510. The first crossbar 510 may be provided in the lower end thereof with a space in which the roller 565 is received. The roller 565 may be configured to have a disk shape having a central hole.

By virtue of interposition of the roller 565, it is possible to reduce the frictional force generated between the projection 561 and the first crossbar 510 when the first crossbar 510 is rotated about the intersecting shaft 591 by the movement of the second slider 522.

The first slider 521 may be connected to the lower end of the second crossbar 520.

The connection between the first slider 521 and the second crossbar 520 may be implemented in a manner symmetrical to the connection between the second slider 522 and the first crossbar 510.

Specifically, the first slider 521 may include a projection, which projects toward the second crossbar 520.

The projection may include a cylindrical body and a cylindrical coupling portion formed on the end of the body in a stepwise fashion. The diameter of the coupling portion is smaller than the diameter of the body. The coupling portion and the body may be formed concentrically. The coupling portion and the body may be integrally formed with each other.

The second crossbar 520 may be provided in the lower end thereof with a hole. The coupling portion of the first slider 521 may be inserted into the hole formed in the lower end of the second crossbar 520.

When the coupling portion is inserted into the hole in the second crossbar 520, a roller may be disposed in the lower end of the second crossbar 520. The second crossbar 520 may be provided in the lower end thereof with a space in which the roller 565 is received. The roller 565 may be configured to have the shape of a disk having a central hole.

By virtue of interposition of the roller 565, it is possible to reduce the generation of a frictional force between the projection and the second crossbar 520 when the second crossbar 520 is rotated about the intersecting shaft 591 by movement of the first slider 521.

Figure 10A:
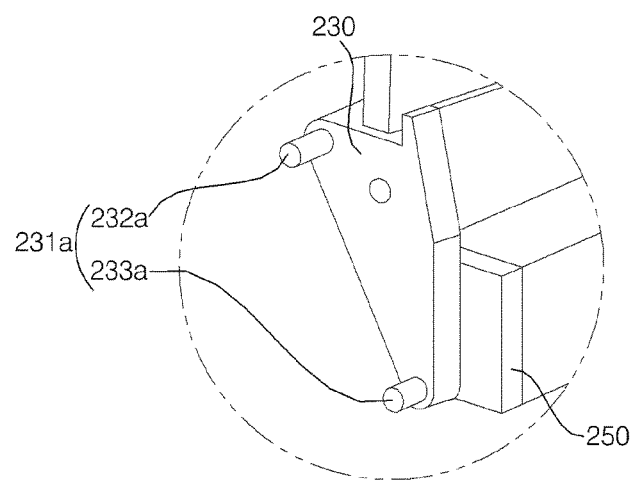
FIGS. 10A and 10B are views illustrating combiner-moving bosses formed at a holder according to the embodiment of the present invention.
Figure 10B:
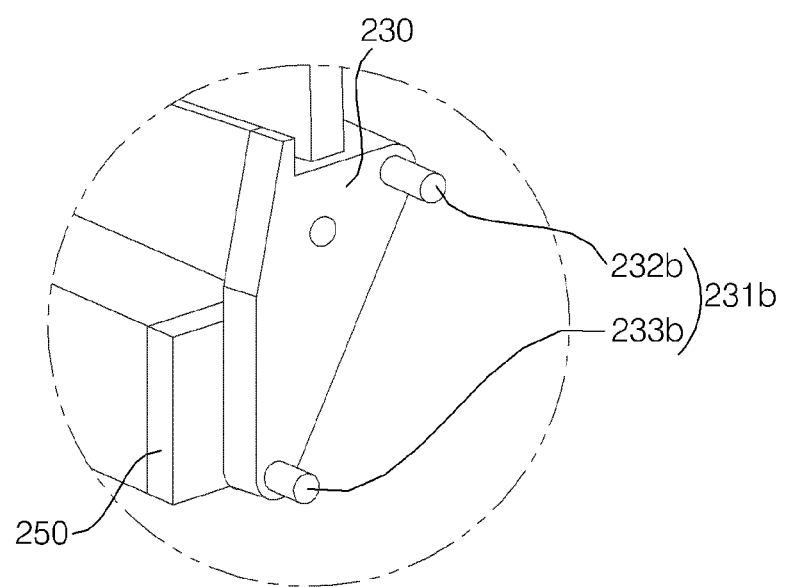

FIGS. 10A and 10B are views illustrating the combiner-moving bosses formed at the holder according to the embodiment of the present invention.

Figure 11A:
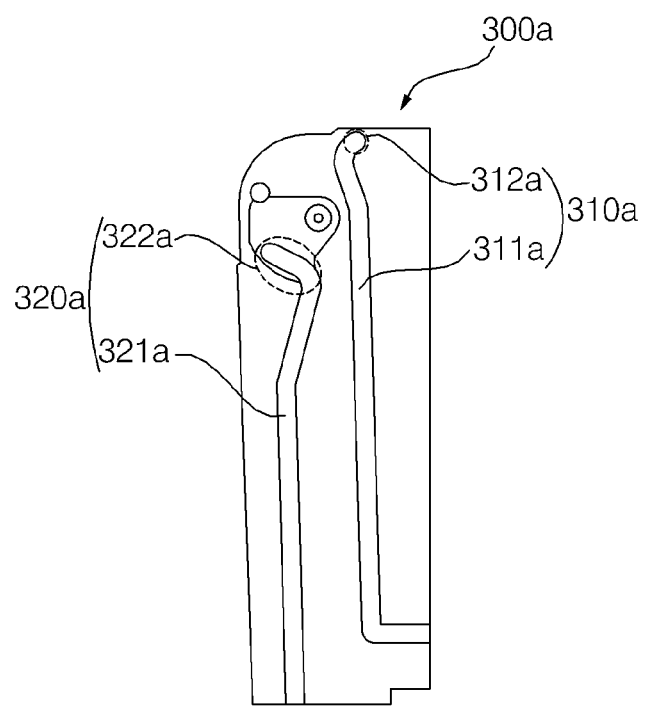
FIGS. 11A and 11B are views illustrating a guide unit according to the embodiment of the present invention.
Figure 11B:
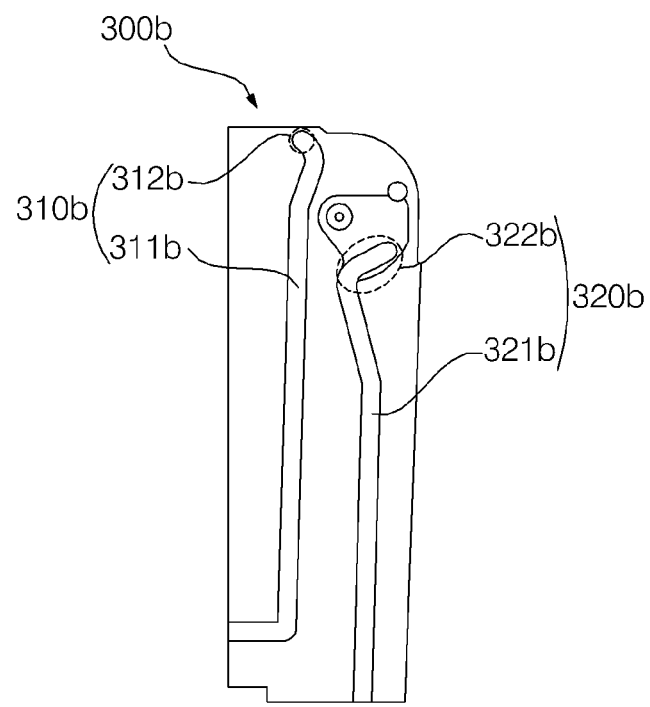

FIGS. 11A and 11B are views illustrating the guide unit according to the embodiment of the present invention.

FIG. 11A illustrates the inside of the first guide part 300a, and FIG. 11B illustrates the inside of the second guide part 300b.

Referring to the drawings, the combiner-moving bosses may include the first combiner-moving boss 231a, illustrated in FIG. 10A, and the second combiner-moving boss 231b, illustrated in FIG. 10B.

The first combiner-moving boss 231a may be disposed so as to correspond to the first guide part 300a illustrated in FIG. 11A.

The first combiner-moving boss 231a may include the first pin 232a and the second pin 233a.

The first guide part 300a may include the movement guide rails 310a and 320a.

The movement guide rails 310a and 320a may include the first guide rail 310a and the second guide rail 320a. The movement guide rails 310a and 320a may be formed in the inner surface of the first guide part 300a. In other words, the movement guide rails 310a and 320a may be formed in the surface of the first guide part 300a that faces the combiner assembly 200.

The first guide rail 310a may guide the movement of the first pin 232a included in the first combiner-moving boss 231a.

The first guide rail 310a may include a movement guide path 311a and a pivot point 312a.

The movement guide path 311a may guide the sliding movement of the combiner assembly 200 in the vertical direction.

The pivot point 312a may serve as a pivot axis when the combiner 210 is tilted.

The second guide rail 320a may guide the movement of the second pin 233a included in the first combiner-moving boss 231a.

The second guide rail 320a may include a movement guide path 321a and a tilting guide path 322a.

The movement guide path 321a may guide the sliding movement of the combiner assembly 200 in the vertical direction.

The tilting guide path 322a may guide the pivoting movement of the combiner 210 while the combiner 210 is tilted.

The first pin 232a of the first combiner-moving boss 231a may project from the holder 230 toward the inner surface of the first guide part 300a.

The first pin 232a may be inserted into the first guide rail 311a, and may be slidably moved along the first guide rail 311a in the vertical direction.

The second pin 233a of the first combiner-moving boss 231a may project from the holder 230 toward the inner surface of the first guide part 300a.

The second pin 233a may be inserted into the second guide rail 312a and may be moved along the second guide rail 321a.

Since the first pin 232a and the second pin 233a are respectively moved along the first guide rail 311a and the second guide rail 321a, the combiner assembly 200 may be slidably moved along the predetermined path in the vertical direction. Consequently, the combiner 210 may be projected and exposed to the outside, or may be retracted and hidden into the slot formed in the dashboard 10.

The second combiner-moving boss 231b may be disposed so as to correspond to the second guide part 300b illustrated in FIG. 11B.

The second combiner-moving boss 231b may include a first pin 232b and a second pin 233b.

The second guide part 300b may include movement guide rails 301b and 320b.

The movement guide rails 310b and 320b may include the first guide rail 310b and the second guide rail 320b. The movement guide rails 310b and 320b may be formed in the inner surface of the second guide part 300b. In other words, the movement guide rails 310b and 320b may be formed in the surface of the second guide part 300b that faces the combiner assembly 200.

The movement guide rails 310b and 320b may include the first guide rail 310b and the second guide rails 320b.

The first guide rail 310b may guide the movement of the first pin 232b included in the second combiner-moving boss 231b.

The first guide rail 310b may include a movement guide path 311b and a pivot point 312b.

The movement guide path 311b may guide the movement of the combiner assembly 200 in the vertical direction.

The pivot point 312b may serve as a pivot axis when the combiner 210 is tilted.

The second guide rail 320b may guide the movement of the second pin 233b, which is included in the second combiner-moving boss 231b.

The second guide rail 320b may include a movement guide path 321b and a tilting guide path 322b.

The movement guide path 321b may guide the sliding movement of the combiner assembly 200 in the vertical direction.

The tilting guide path 322b may guide the pivoting movement of the combiner 210 while the combiner 210 is tilted.

The first pin 232b of the second combiner-moving boss 231b may project from the holder 230 toward the inner surface of the second guide part 300b.

The first pin 232a may be inserted into the first guide rail 311b, and may be slidably moved along the first guide rail 311b in the vertical direction.

The second pin 233b of the second combiner-moving boss 231b may project from the holder 230 toward the inner surface of the second guide part 300b.

The second pin 233b may be inserted into the second guide rail 312b and may be moved along the second guide rail 312b.

Since the first pin 232b and the second pin 233b are respectively moved along the first guide rail 311b and the second guide rail 321b, the combiner assembly 200 may be slidably moved along the predetermined path in the vertical direction. Consequently, the combiner 210 may be projected and exposed to the outside, or may be retracted and hidden into the slot formed in the dashboard 10.

Figure 12A:
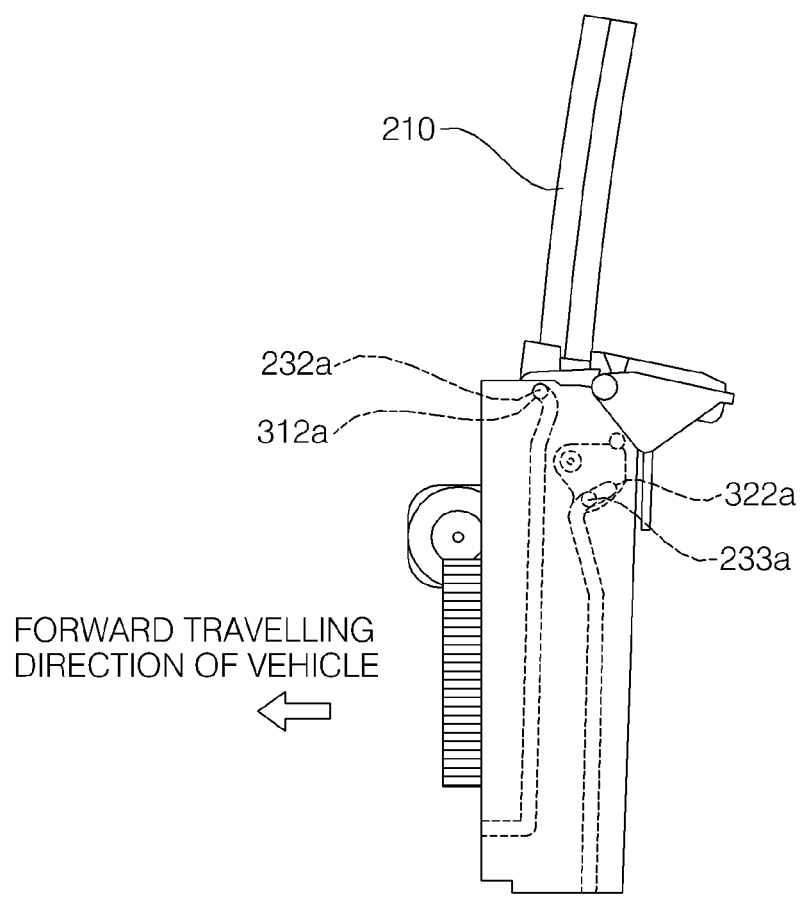
FIGS. 12A and 12B are views illustrating an operation of tilting the combiner according to the embodiment of the present invention.
Figure 12B:
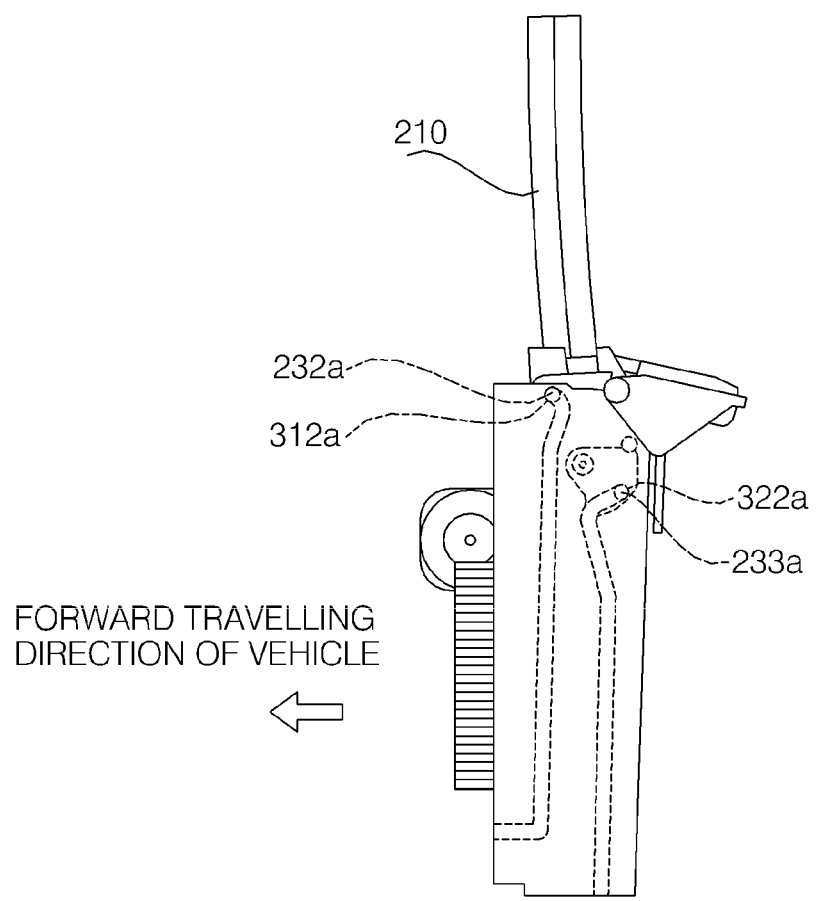

FIGS. 12A and 12B are views illustrating the operation of tilting the combiner according to the embodiment of the present invention.

Referring to the drawings, the first pin 232a of the first combiner-moving boss 231a may be inserted into the first guide rail 310a of the first guide part 300a, and may be moved along the first guide rail 310a.

The first guide rail 310a may include the movement guide path 311a and the pivot point 312a.

The second pin 233a of the first combiner-moving boss 231a may be inserted into the second guide rail 320a of the first guide part 300a, and may be moved along the second guide rail 320a.

The second guide rail 320a may include the movement guide path 321a and the tilting guide path 322a.

The first pin 232a and the second pin 233a may be moved upward along the movement guide paths 311a and 321a by the driving force supplied from the drive unit 50.

The first pin 232a may be moved to the pivot point 312a. Since the first pin 232a is positioned higher than the second pin 233a, the second pin 233a may be moved further within the zone of the tilting guide path 322a, even after the first pin 232a reaches the pivot point 312a.

When the driving force is continuously supplied from the drive unit 50 after the first pin 232a reaches the pivot point 312a, the second pin 233a may be moved backward and upward along the tilting guide path 322a.

At this time, the combiner assembly 200 may be pivotally moved about the first pin 232a, serving as a shaft, by the movement of the second pin 233a along the tilting guide path 322a. The combiner assemble 200 may be pivotally moved about the first pin when the first pin is located at the pivot point. With the pivotal movement of the combiner assembly 200, the combiner 210 may be tilted.

The tilting degree of the combiner 210 may be determined in accordance with the degree to which the second pin 233a is moved in the tilting guide path 322a.

The first pin 232b of the second combiner-moving boss 231b may be inserted into the first guide rail 301b of the second guide part 300b, and may be moved along the first guide rail 310b.

The first guide rail 310b may include the movement guide path 311b and the pivot point 312b.

The second pin 233b of the second combiner-moving boss 231b may be inserted into the second guide rail 320b of the second guide part 300b, and may be moved along the second guide rail 320b.

The second guide rail 320b may include the movement guide path 321b and the tilting guide path 322b.

The first pin 232b and the second pin 233b may be moved upward along the movement guide paths 311b and 321b by the driving force supplied from the drive unit 50.

The first pin 232b may be moved to the pivot point 312b. Since the first pin 232b is positioned higher than the second pin 233b, the second pin 233b may be moved further along the tilting guide path 322b even after the first pin 232b reaches the pivot point 312b.

When the driving force is continuously supplied from the drive unit 50 after the first pin 232b reaches the pivot point 312b, the second pin 233b may be moved backward and upward along the tilting guide path 322b.

At this time, the combiner assembly 200 may be pivotally moved about the first pin 232b, serving as a shaft, by the movement of the second pin 233b along the tilting guide path 322b. With the pivotal movement of the combiner assembly 200, the combiner 210 may be tilted.

The tilting degree of the combiner 210 may be determined in accordance with the degree to which the second pin 233b is moved along the tilting guide path 322b.

The combiner 210 may be tilted by driving force supplied from the drive unit 50.

Figure 13A:
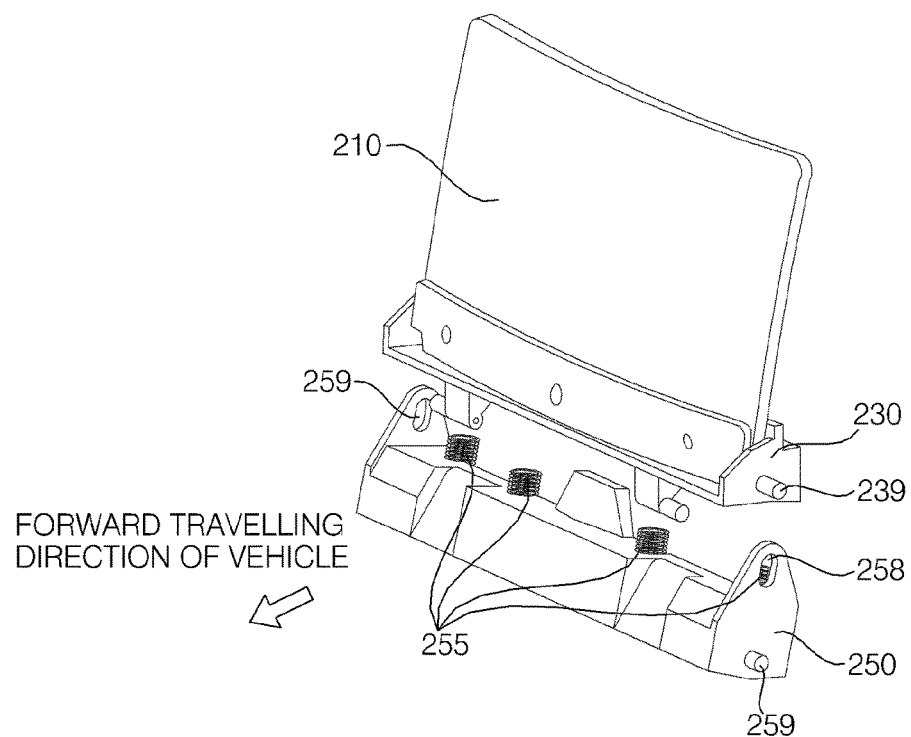
FIGS. 13A to 13C are views illustrating an operation of tilting the combiner according to an embodiment of the present invention.
Figure 13B:
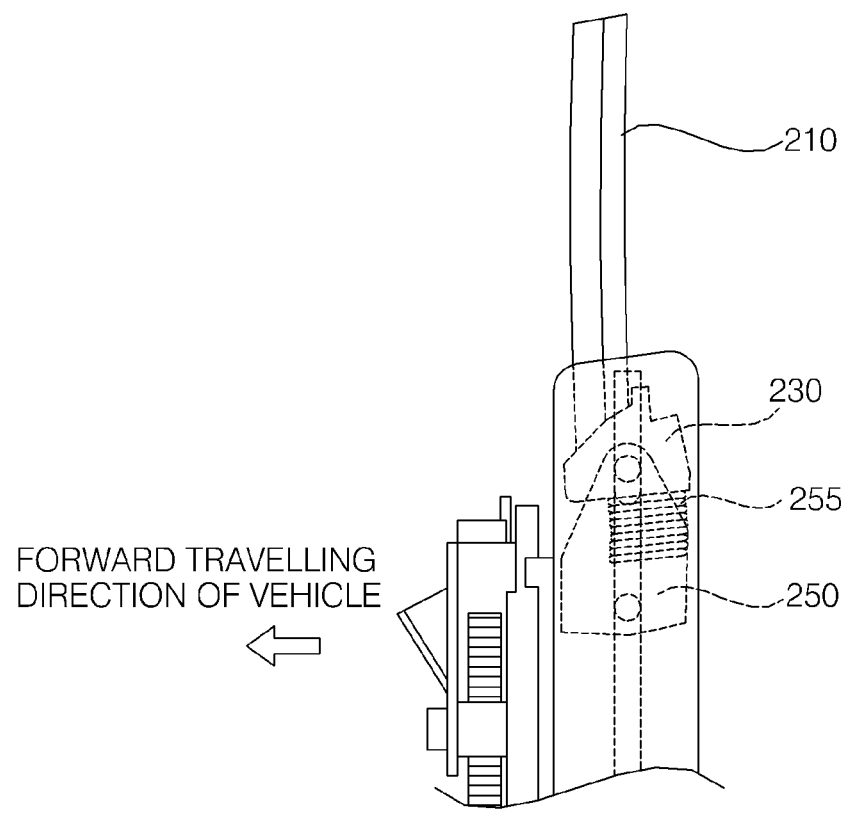
Figure 13C:
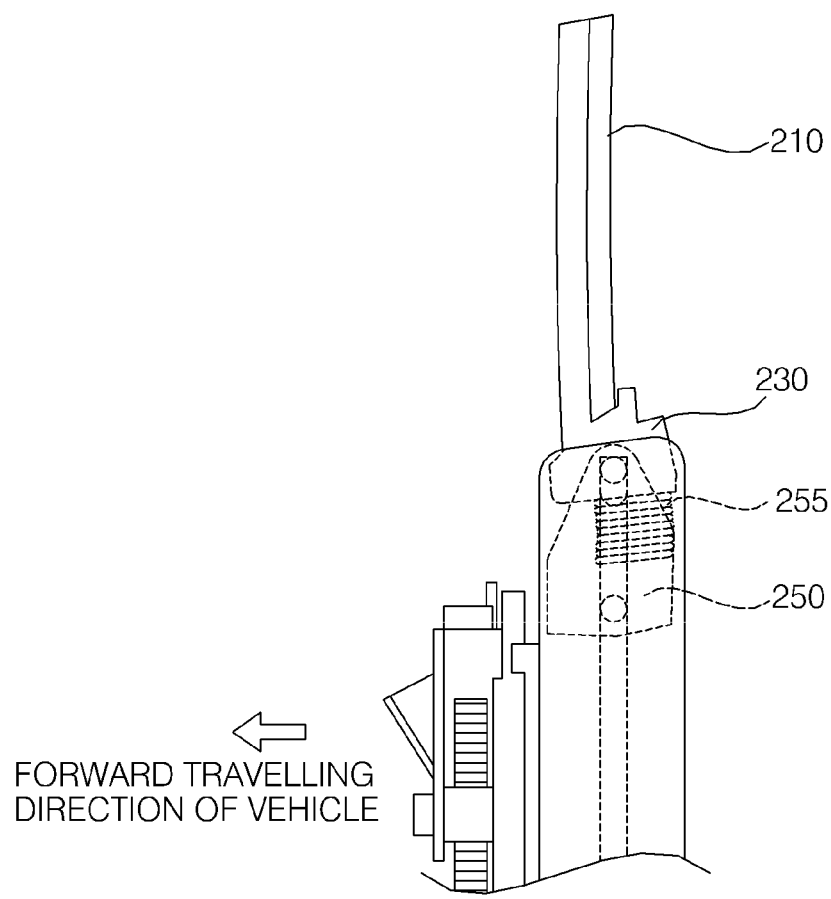

FIGS. 13A to 13C are views illustrating an operation of tilting the combiner according to an embodiment of the present invention.

Referring to the drawings, the holder 230 and the lifting module 250 may be coupled to each other by an elastic member 255. Here, the elastic member 255 may be composed of one or more springs.

The holder 230 may include a first pin 239 and a second pin. The first pin 239 and the second pin may be configured so as to be bilaterally symmetrical to each other.

The first pin 239 may project from the holder 230 toward the first guide part 300a.

The lifting module 250 may include a first orbital ring 258 and a second orbital ring 259. The first orbital ring 258 may be formed at the left upper end of the lifting module 250. The second orbital ring 259 may be formed at the right upper end of the lifting module 250.

The first orbital ring 258 may guide the movement of the first pin 239 while the elastic member 255 is compressed.

The second orbital ring 259 may guide the movement of the second pin while the elastic member 255 is compressed.

The first pin 239 may be inserted into the first orbital ring 258. The second pin may be inserted into the second orbital ring 259.

The lifting module 250 may include a first moving pin 259 and a second moving pin. The first moving pin may be formed at the left lower end of the lifting module 250. The second moving pin may be formed at the right lower end of the lifting module 250.

The first moving pin 259 may be inserted into the guide rail formed in the inner surface of the first guide part 300a, and may be moved vertically along the guide rail.

The second moving pin may be inserted into the guide rail formed in the inner surface of the second guide part 300b, and may be moved vertically along the guide rail.

As illustrated in FIG. 13B, by the driving force supplied from the drive unit 50, the first moving pin 259 and the second moving pin may be moved upward along the respective guide rails of the first guide part 300a and the second guide part 300b. With the movement of the first moving pin 259 and the second moving pin, the combiner assembly 200 may be moved upward.

As illustrated in FIG. 13C, the first moving pin 259 and the second moving pin may be moved to the ends of the guide rails. When the driving force is continuously supplied from the drive unit 50 after the first moving pin 259 and the second moving pin are moved to the ends of the guide rails, the elastic member 255 may be compressed.

As the elastic member 255 is compressed, the first pin 239 included in the holder 230 may be moved upward along the first orbital ring 258. As the elastic member 255 is compressed, the second pin included in the holder 230 may be moved upward along the second orbital ring 259.

The lower end of the holder 230 may be inclined downward in the forward direction. The elastic member 255 may be disposed at the rear portion of the lower end of the holder 230. When the elastic member 255 is compressed, the driving force acting on the rear portion of the lower end of the holder 230 may be exerted upward. At this time, the combiner 210 may be tilted forward about the first pin 239.

When the elastic member 255 is compressed by the driving force supplied from the drive unit 50, the combiner 210 may be tilted about the first pin 239 and the second pin included in the holder 230, which serve as the rotational shaft.

FIGS. 14A to 14E are views illustrating a slot cover according to the embodiment of the present invention.

Referring to the drawings, the combiner-positioning apparatus 100 may include the slot cover 600, a first lever 610a and a second lever 610b.

The slot cover 600 may open and close the slot formed in the dashboard 10. When the combiner 210 is retracted and hidden, the slot cover 600 is closed. When the combiner 210 is projected and exposed, the slot cover 600 is open.

The first lever 610a may be connected at one end thereof to an end of the slot cover 600, and may be connected at the other end thereof to the lifting module 250. Specifically, the other end of the first lever 610a may be connected via the first combiner-moving boss 231a. For example, the other end of the first lever 610a may be connected via the first pin 232a or the second pin 233a of the first combiner-moving boss 231a. More specifically, the first lever 610a may be connected to the combiner assembly 200 via the first combiner-moving boss 231a.

The first lever 610a may be rotated about a first rotating shaft 611a. The first rotating shaft 611a may be positioned closer to the lifting module 250 than the slot cover 600 when the combiner 210 is retracted and hidden. Accordingly, even when the lower end of the first lever 610a is slightly moved by rotation of the first lever 610a, the slot cover 600 is greatly moved by the principle of leverage, thereby efficiently opening and closing the slot.

The first lever 610a may be curved. For example, the first lever 610a may be curved into an "S" shape. The first lever 610a, which is curved into an "S" shape, may include an upper curved portion 612a and a lower curved portion 613a. In this case, the first rotating shaft 611a may be formed at the lower curved portion 613a.

The curvature of the upper curved portion 612a may be less than that of the lower curved portion 613a. For example, the lower curved portion 613a may be more sharply curved than the upper curved portion 612a.

Since the first lever 610a is configured to have a curved shape in this manner, the effect resulting from the principle of leverage is maximized. Furthermore, even when the lower end of the first lever 610a is slightly moved, the first lever 610a is greatly rotated, thereby enabling the slot cover 600 to efficiently open and close the slot.

The first lever 610a may be provided in the inner surface thereof with an open guide 615a. The first pin 232a or the second pin 233a of the first combiner-moving boss 231a may extend through the first guide part 300a and may be inserted into the open guide 615a.

When the first pin 232a or the second pin 233a of the first combiner-moving boss 231a is moved along the open guide 615a by the driving force supplied from the drive unit 50, the first lever 610a may be rotated about the first rotating shaft 611a. By the rotation of the first lever 610a, the slot cover 600 may open and close the slot.

The second lever 610b may be connected at an end thereof to the other end of the slot cover 600. The second lever 610b may be configured so as to be bilaterally symmetrical with the first lever 610a. The movement of the second lever 610b may be symmetrical with the movement of the first lever 610a.

The second lever 610b may be connected at the other end thereof to the lifting module 250. Specifically, the other end of the second lever 610b may be connected via the second combiner-moving boss 231b. For example, the other end of the second lever 610b may be connected via the first pin 232b or the second pin 233b of the second combiner-moving boss 231b. In other words, the second lever 610b may be connected to the combiner assembly 200 via the second combiner-moving boss 231b.

The second lever 610b may be rotated about a second rotating shaft. When the combiner 210 is retracted and hidden, the second rotating shaft may be disposed closer to the lifting module 250 than the slot cover 600.

Accordingly, even when the lower end of the second lever 610b is moved slightly by rotation of the second lever 610b, the second lever 610b is greatly rotated, thereby enabling the slot cover 600 to efficiently open and close the slot.

The second lever 610b may be curved. For example, the second lever 610b may be curved into an "S" shape. The second lever 610b, which is curved into an "S" shape, may include an upper curved portion and a lower curved portion. In this case, the second rotating shaft may be formed at the lower curved portion.

The curvature of the upper curved portion may be less than that of the lower curved portion. For example, the lower curved portion may be more sharply curved than the upper curved portion.

Since the second lever 610b is configured to have a curved shape in this manner, the effect resulting from the principle of leverage is maximized. Furthermore, even when the lower end of the second lever 610b is slightly moved, the second lever 610b is greatly rotated, thereby enabling the slot cover 600 to efficiently open and close the slot.

The second lever 610b may be provided in the inner surface thereof with an open guide. The first pin 232b or the second pin 233b of the second combiner-moving boss 231b may extend through the second guide part 300b and may be inserted into the open guide.

When the first pin 232b or the second pin 233b of the second combiner-moving boss 231b is moved along the open guide by the driving force supplied from the drive unit 50, the second lever 610b may be rotated about the first rotating shaft. By the rotation of the second lever 610b, the slot cover 600 may open and close the slot.

Figure 14A:
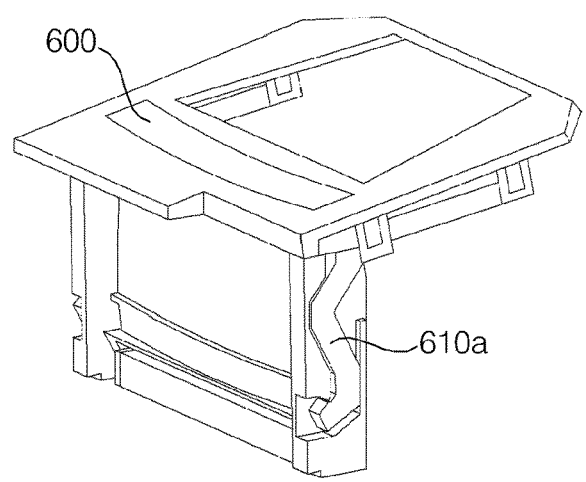
FIGS. 14A to 14E are views illustrating a slot cover according to the embodiment of the present invention.
Figure 14B:
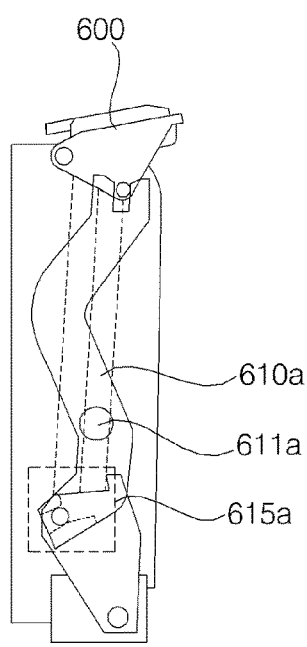
Figure 14C:
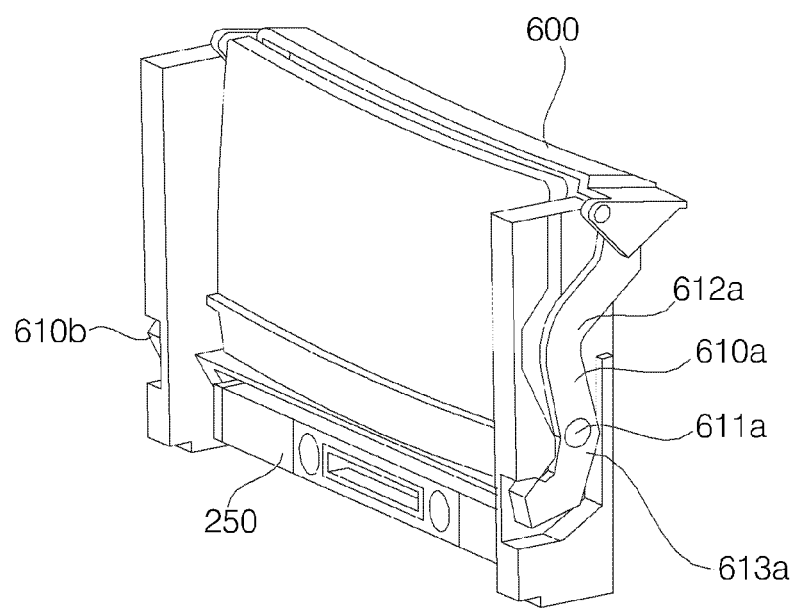
Figure 14D:
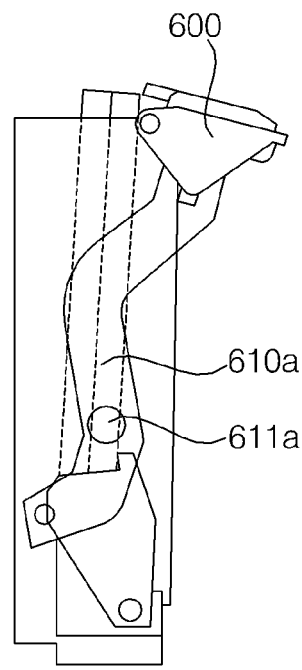
Figure 14E:
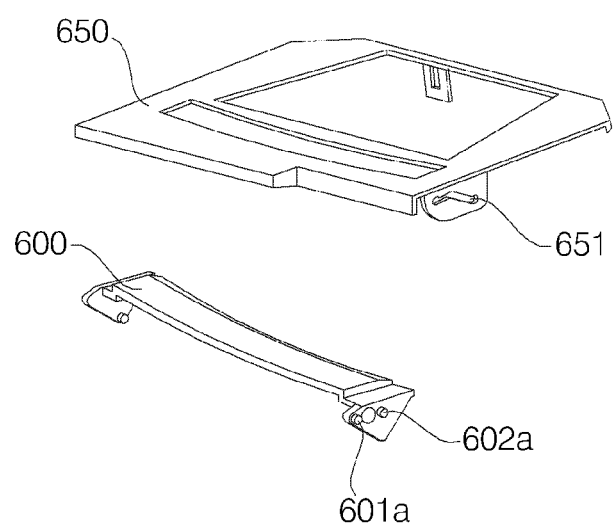

As illustrated in FIG. 14E, the combiner-positioning apparatus 100 may include an upper plate 650. The upper plate 650 may cover the combiner-positioning apparatus 100.

The upper plate 650 may include a slot for allowing the combiner 210 to be projected and exposed therethrough. The upper plate 650 may include a cover-opening and closing guide 651 for opening and closing the slot cover 600.

The slot cover 600 may cover the slot formed in the upper plate 650. The slot cover 600 may include pins 601*a* and 602*a* for guiding opening and closing of the slot cover 600. The pins 601*a* and 602*a* may be provided at both lateral surfaces of the slot cover 600 in a bilateral symmetrical manner. For example, two pins 601*a* and 602*a* may be provided on the left side surface of the slot cover 600, and two pins may be provided on the right side surface of the slot cover 600.

The pin 601*a* and 602*a* formed on the slot cover 600 may be inserted into the cover-opening and closing guide 651 formed in the upper plate 650. By the driving force supplied from the drive unit 50, the pins 601*a* and 602*a* may be moved along the cover-opening and closing guide 651.

Since the plurality of pins 601*a* and 602*a* are inserted into the cover-opening and closing guide 651, it is possible to reliably guide the opening and closing of the slot cover 600. To this end, the cover-opening and closing guide 651 may extend horizontally rearward by a predetermined length and may extend further rearward while being inclined downward.

When the plurality of pins 601*a* and 602*a* are positioned in the zone of the cover-opening and closing guide 651 that extends horizontally, the slot cover 600 may close the slot. When the plurality of pins 601*a* and 602*a* are positioned in the zone of the cover-opening and closing guide 651 that is inclined rearward, the slot cover 600 may open the slot.

Figure 15:
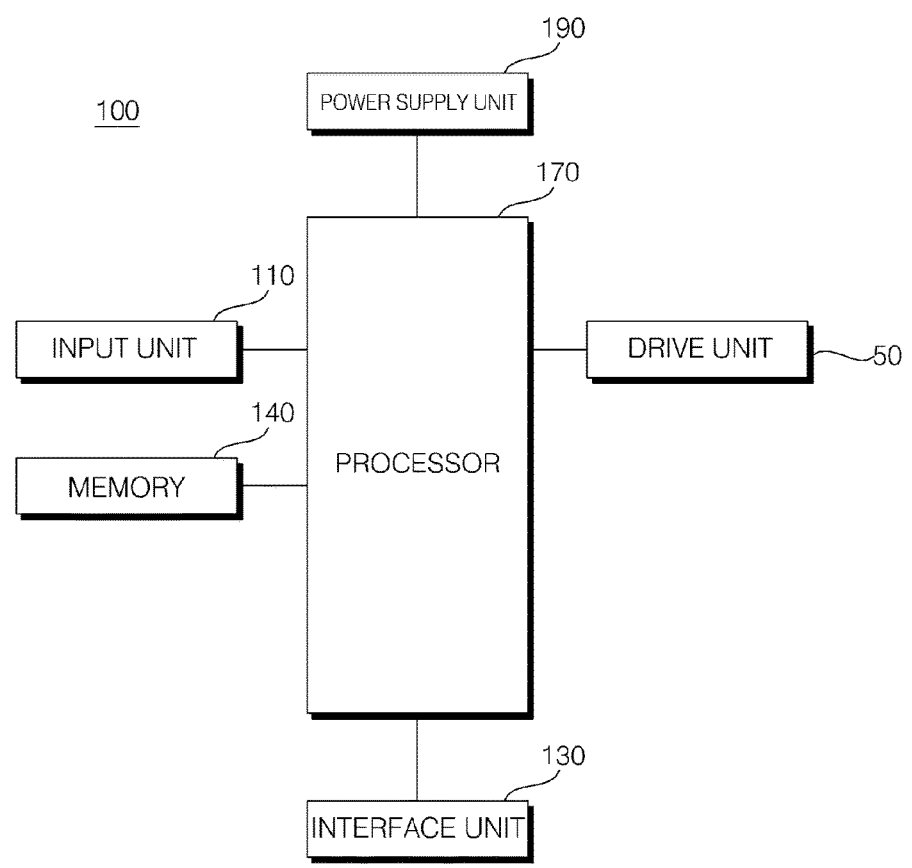
FIG. 15 is a control block diagram of the combiner-positioning apparatus according to the embodiment of the present invention.

FIG. 15 is a control block diagram of the combiner-positioning apparatus according to the embodiment of the present invention.

Referring to the drawing, the combiner-positioning apparatus 100 for a vehicular head-up display may include an input unit 110, an interface unit 130, a memory 140, a processor 170, the drive unit 50 and a power supply unit 190.

The input unit 110 may receive user input. The input unit 110 may include a mechanical input device, a touch input device, a voice input device or a wireless input device.

The mechanical input device may include a button, a lever, a jog wheel, a switch and the like.

The touch input device may include at least one touch sensor. The touch input device may be constituted by a touch screen.

The voice input device may include a microphone for converting a user's voice into an electrical signal.

The wireless input device may receive user input, which is input through keys from outside the vehicle 1 in a wireless manner.

The input unit 110 may receive user input for exposure and hiding of the combiner 210.

The input unit 110 may receive user input for tilting of the combiner 210.

The interface unit 130 may receive various signals, information or data, or may transmit signals, information or data, which are processed or created in the processor 170, to the outside. To this end, the interface unit 130 may perform data communication with an ECU of a vehicle, a sensing unit, a vehicular drive unit or the like in a wired communication manner or wireless communication manner.

The interface unit 130 may receive sensor information from the ECU or the sensing unit.

Here, the sensor information may include at least one of vehicle direction information, vehicle position information (GPS information), vehicle angle information, vehicle speed information, vehicle acceleration information, vehicle slope information, vehicle forward/backward travel information, battery information, fuel information, tire information, vehicle lamp information, vehicle internal temperature information, vehicle internal humidity information and information regarding whether or not it is raining.

The sensor information may be obtained using a heading sensor, a yaw sensor, a gyro sensor, a position module, a vehicle forward/backward travel sensor, a wheel sensor, a vehicle speed sensor, a vehicle slope sensor, a battery sensor, a fuel sensor, a tire sensor, a sensor for detecting steering due to rotation of a handle, a vehicle internal temperature sensor, a vehicle internal humidity sensor or a rain sensor. The position module may include a GPS module for receiving GPS information.

Among such sensor information, vehicle direction information, vehicle position information, vehicle angle information, vehicle speed information, vehicle slope information and the like, which are associated with travelling of a vehicle, may be referred to as vehicle travelling information.

The interface unit 130 may receive information about acceleration or deceleration of the vehicle 1 from the ECU or the sensing unit of the vehicle 1.

The position and posture of the seats, the central mirror and the side mirrors of the vehicle 1 may be changed to be suitable for a user in response to user input. Alternatively, the position and posture of the seats, the central mirror and the side mirrors of the vehicle 1 may be automatically changed to be suitable for a user in accordance with the user's posture, which is sensed by a camera or the like.

The interface unit 130 may receive state information of a driver's seat, state information of a central mirror and state information of side mirrors from the ECU of the vehicle 1.

The memory 140 may store programs for process or control of the processor 170, and various data required for the overall operation of a vehicle door control device.

The memory 140 may store state information of seats with respect to a driver, state information of a central mirror with respect to a driver, and state information of side mirrors with respect to a driver.

The state information of seats may be information regarding the positions and postures of seats. The state information of a central mirror may be information regarding the position and posture of a central mirror. The state information of side mirrors may be information regarding the positions and postures of side mirrors.

The memory 140 may be one of various hardware storage devices such as ROM, RAM, EPROM, flash drives and hard drives. In some embodiments, the memory 140 may be included as a subcomponent of the processor 170.

The processor 170 may control the overall operation of various units in the combiner-positioning apparatus 100.

The processor 170 may be electrically connected to the input unit 110, the interface unit 130, the memory 140, the drive unit 50 and the power supply unit 190.

The processor 170 may receive acceleration or deceleration information of the vehicle 1 via the interface unit 130.

The processor 170 may receive state information of a driver's seat, state information of a central mirror and state information of side mirrors via the interface unit 130.

The processor 170 may control the drive unit 50. The processor 170 may control the degree or direction of the driving force supplied from the drive unit 50.

For example, the processor 170 may control the drive unit 50 so as to control the angle of inclination of the combiner 210 based on acceleration or deceleration information of the vehicle 1.

For example, when the vehicle 1 accelerates, the driver's posture is inclined rearward due to the inertial force. At this time, the processor 170 may control the combiner 210 to be tilted in accordance with the driver's posture.

In contrary, when the vehicle 1 decelerates, the driver's posture is inclined forward due to the inertial force. At this time, the processor 170 may control the combiner 210 to be tilted in accordance with the driver's posture.

For example, the processor 170 may control the drive unit 50 so as to control the tilted degree of the combiner 210 based on state information of a driver's seat, state information of a central mirror or state information of side mirrors.

Since drivers have different physical sizes, a driver's seat, a central mirror and side mirrors must be manually or automatically controlled so as to be suitable for the driver upon entering the vehicle 1. Furthermore, the angle of inclination of the combiner 210 must also be changed so as to be suitable for the driver's view in accordance with the driver's physical size. The angle of inclination of the combiner 210 is controlled based on state information of a driver's seat, state information of a central mirror or state information of side mirrors, whereby the angle of inclination of the combiner 210 may be controlled so as to provide accurate information without interfering with the driver's driving.

The processor 170 may be embodied by at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and electrical units for performing other functions.

The drive unit 50 may create and provide a driving force under the control of the processor 170. The drive unit 50 may include a motor.

When the drive unit 50 includes a motor, the drive unit 50 may provide driving force in a first or second rotational direction under the control of the processor 170. In this regard, the second rotational direction may be opposite the first rotational direction.

The power supply unit 190 may supply power required for the operation of respective components under the control of the processor 170. The power supply unit 190 may receive power from a battery or the like inside the vehicle.

The embodiments of the present invention offer at least one of the following effects.

First, since the combiner assembly is projected and exposed or is retracted and hidden as it is slidably moved vertically, it is possible to embody the combiner-positioning apparatus for a head-up display having a minimized volume.

Second, since the power transmission unit and the combiner assembly are disposed to face each other, it is possible to expose or hide the combiner even in a small space.

Third, since the combiner can be linearly moved and tilted by the same driving force, it is possible to implement both the linear movement and the tilting action of the combiner using a single drive unit.

Fourth, since the movement of the combiner and the action of opening the door are implemented by the same driving force, it is possible to implement movement of the combiner and opening of the door using the same drive unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A combiner-positioning apparatus for a vehicle head-up display mountable in a dashboard of a vehicle, the dashboard including a slot, the combiner-positioning apparatus comprising:
   a driver configured to supply a driving force;
   a combiner assembly including a combiner, the combiner assembly being configured to project and expose the combiner to an outside and to retract and cover the combiner in the slot based on the driving force;
   a guide mechanism configured to guide movement of the combiner assembly in a vertical direction;
   a power transmitter configured to transmit the driving force to the combiner assembly; and
   a slot cover configured to open and close the slot,
   wherein the combiner assembly includes a lifting module having a lifting rail,
   wherein the power transmitter includes a cam wheel including a combiner-driving boss, the combiner-driving boss being linearly moveable along the lifting rail,
   wherein a major surface of the cam wheel is disposed so as to face the combiner, and
   wherein the combiner-positioning apparatus further comprises a lever, the lever having a first end connected to the slot cover and a second end connected to the lifting module.

2. The combiner-positioning apparatus according to claim 1, wherein the guide mechanism includes a movement guide rail, and
   wherein the combiner assembly includes a holder to hold the combiner, the holder including a combiner-moving boss, and the combiner-moving boss being movable along the movement guide rail.

3. The combiner-positioning apparatus according to claim 2, wherein the combiner-moving boss comprises:
   a first pin; and
   a second pin spaced apart from the first pin, and
   wherein the movement guide rail comprises:
   a first guide rail configured to guide movement of the first pin; and
   a second guide rail configured to guide movement of the second pin.

4. The combiner-positioning apparatus according to claim 3, wherein the first guide rail comprises:
   a first movement guide path configured to guide movement of the combiner assembly; and
   a pivot point configured to serve as a pivot axis to allow the combiner to be tilted.

5. The combiner-positioning apparatus according to claim 4, wherein the second guide rail comprises:
   a second movement guide path configured to guide movement of the combiner assembly; and
   a tilting guide path configured to guide pivoting movement of the combiner when the combiner is tilted.

6. The combiner-positioning apparatus according to claim 5, wherein the combiner assembly is pivotally moved about the first pin when the first pin is located at the pivot point.

7. The combiner-positioning apparatus according to claim 2, wherein the holder and the lifting module are elastically coupled to each other via an elastic member,
   wherein the holder includes a pin, and
   wherein the lifting module includes an orbital ring configured to guide movement of the pin while the elastic member is compressed.

8. The combiner-positioning apparatus according to claim 7, wherein the combiner is tilted about the pin when the elastic member is compressed by the driving force.

9. The combiner-positioning apparatus according to claim 7, wherein a lower end of the holder is inclined downward in a forward direction.

10. The combiner-positioning apparatus according to claim 1, wherein the combiner is tilted based on the driving force.

11. The combiner-positioning apparatus according to claim 1, wherein the lever is rotatable about a rotational shaft, the rotational shaft being positioned closer to the lifting module than the slot cover when the combiner is retracted and covered.

12. The combiner-positioning apparatus according to claim 1, wherein the lever is curved.

13. The combiner-positioning apparatus according to claim 1, wherein the guide mechanism includes a movement guide rail,
wherein the combiner assembly includes a holder to hold the combiner, the holder including a combiner-moving boss, and the combiner-moving boss being movable along the movement guide rail, and
wherein the lever is connected to the combiner assembly via the combiner-moving boss.

14. A combiner-positioning apparatus for a vehicle head-up display mountable in a dashboard of a vehicle, the dashboard including a slot, the combiner-positioning apparatus comprising:
a driver configured to supply a driving force;
a combiner assembly including a combiner, the combiner assembly being configured to project and expose the combiner to an outside and to retract and cover the combiner in the slot based on the driving force;
a guide mechanism configured to guide movement of the combiner assembly in a vertical direction;
a power transmitter configured to transmit the driving force to the combiner assembly; and
a slot cover configured to open and close the slot,
wherein the combiner assembly includes a lifting module, and
wherein the combiner-positioning apparatus further comprises a lever, the lever having a first end connected to the slot cover and a second end connected to the lifting module.

15. The combiner-positioning apparatus according to claim 14, further comprising a crossbar link including a pair of pins,
wherein the lifting module includes a pair of lifting rails, and
wherein the pair of pins is linearly movable along the pair of lifting rails.

16. The combiner-positioning apparatus according to claim 15, wherein the power transmitter comprises:
a bilateral lead screw; and
a worm gear module configured to transmit the driving force to the bilateral lead screw.

17. The combiner-positioning apparatus according to claim 16, further comprising a pair of sliders, the pair of sliders being threadedly engaged with the bilateral lead screw, and the pair of sliders being connected to respective ends of the crossbar link.

* * * * *